US010607191B2

(12) United States Patent
Garg et al.

(10) Patent No.: US 10,607,191 B2
(45) Date of Patent: Mar. 31, 2020

(54) EFFICIENT CALENDAR CREATION

(71) Applicant: Microsoft Technology Licensing, LLC, Redmond, WA (US)

(72) Inventors: Vivek Garg, Seattle, WA (US); Christopher Jay Hoorn, Bellevue, WA (US); Jamie Cabaccang, Bellevue, WA (US); Evan Ming Lew, Redmond, WA (US); Robert David Berg, Bellevue, WA (US); Erica L. Klein, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 953 days.

(21) Appl. No.: 14/991,334

(22) Filed: Jan. 8, 2016

(65) Prior Publication Data

US 2017/0200129 A1 Jul. 13, 2017

(51) Int. Cl.

| | |
|---|---|
| ***G06Q 10/00*** | (2012.01) |
| ***G06Q 10/10*** | (2012.01) |
| ***G06F 16/9535*** | (2019.01) |
| ***H04L 12/58*** | (2006.01) |
| ***G06F 16/248*** | (2019.01) |

(52) U.S. Cl.

CPC ....... *G06Q 10/1095* (2013.01); *G06F 16/248* (2019.01); *G06F 16/9535* (2019.01); *G06Q 10/1093* (2013.01); *H04L 51/046* (2013.01)

(58) Field of Classification Search

None

See application file for complete search history.

(56) References Cited

U.S. PATENT DOCUMENTS

| | | | | |
|---|---|---|---|---|
| 2008/0162614 | A1 | 7/2008 | Hurmola et al. | |
| 2011/0119628 | A1 | 5/2011 | Carter et al. | |
| 2011/0239146 | A1 | 9/2011 | Dutta et al. | |
| 2015/0193819 | A1* | 7/2015 | Chang ................ | G06Q 30/0252 705/7.19 |
| 2015/0347534 | A1* | 12/2015 | Gross ................ | G06F 17/30554 707/722 |
| 2016/0162172 | A1* | 6/2016 | Rathod ................ | G06F 3/0481 715/747 |
| 2016/0360336 | A1* | 12/2016 | Gross .................... | H04W 4/025 |
| 2018/0032997 | A1* | 2/2018 | Gordon ............. | G06Q 20/3224 |

OTHER PUBLICATIONS

"International Search Report and Written Opinion Issued in PCT Application No. PCT/US2016/068610", dated Apr. 5, 2017, 11 Pages.

* cited by examiner

*Primary Examiner* — Gurkanwaljit Singh
(74) *Attorney, Agent, or Firm* — Michael Best & Friedrich LLP

(57) ABSTRACT

Systems and methods for creating a calendar event on a calendar are presented. In response to a request to create a calendar event on a calendar, a first set of calendar event suggestions are presented to a user on a computing device. In response to a selection of a calendar event suggestion, an attribute corresponding to the selected calendar event suggestion is added to an attribute set. A subsequent set of calendar event suggestions are then presented on the computing device. In response to a selection of a subsequent calendar event suggestion, an attribute corresponding to the subsequent calendar event suggestion is added to an attribute set. A calendar event is created on the calendar according to the attributes in the attribute set in response to an instruction to create the calendar event.

20 Claims, 9 Drawing Sheets

| Entry Type | Attributes | Value | Display Text |
|---|---|---|---|
| "What" | Text | "Review" | "Review" |
| "What" | Text | "charts" | "charts" |
| "With" | Text, Users | "with" | "with" |
| "Who" | User | 1113 | "Carie" |
| "Who" | User | 725 | "Chris" |
| "Who" | User | 229 | "Erica" |
| "When" | Date | 2015:316 | "11/12/2015" |
| "When" | Time | 1030 | "10:30" |
| "When" | Duration | 60 | "to 11:30" |

EFFICIENT CALENDAR CREATION

BACKGROUND

More and more people are relying upon mobile devices to stay "on-line", i.e., remain in electronic communication with others. There are many apps and applications that enable a user to stay connected using a smart mobile device. However, while smart mobile devices have many useful capabilities, due to their size factor and limited processing power, smart mobile devices are usually limited in the breadth of what the apps and applications can offer.

One example of such limited ability is in regard to calendaring and scheduling. While a user may be able to view his/her calendar on a smart mobile device, or even create a calendar event, due in part to limited abilities to enter information (typically via touch screens or small alpha/numeric keys) as well as the ability to display substantial amounts of information at the same time, more often than not the ability to create a calendar event or organize a schedule event is quite difficult such that these users wait until at a more full-featured computer before creating such events.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems, methods and computer-readable media for creating a calendar event on a calendar are presented. In response to a request to create a calendar event on a calendar, a first set of calendar event suggestions are presented to a user on a computing device. In response to a selection of a calendar event suggestion, an attribute corresponding to the selected calendar event suggestion is added to an attribute set. A subsequent set of calendar event suggestions are then presented on the computing device. In response to a selection of a subsequent calendar event suggestion, an attribute corresponding to the subsequent calendar event suggestion is added to an attribute set. A calendar event is created on the calendar according to the attributes in the attribute set in response to an instruction to create the calendar event.

According to additional aspects of the disclosed subject matter, a computer-implemented method for creating a calendar event on a calendar is presented. In response to a request from a computer user to create the calendar event, a first set of calendar event suggestions for creating a calendar event on the calendar is identified. The first set of calendar event suggestions is presented to the user as user-actionable controls on the computing device. A user selection of a first calendar event suggestion of the first set of calendar event suggestions is received and a first attribute associated with the selected first calendar event suggestion is determined and stored in an attribute set corresponding to the calendar event. A subsequent set of calendar event suggestions for creating a calendar event on the calendar is identified. The subsequent set of calendar event suggestions is presented to the user as user-actionable controls on the computing device. A user selection of a subsequent calendar event suggestion of the subsequent set of calendar event suggestions is received and a subsequent attribute associated with the selected subsequent calendar event suggestion is determined and stored in an attribute set corresponding to the calendar event. A calendar event is created on the calendar according to the attributes in the attribute set in response to an instruction to create the calendar event from the user.

According to further aspects of the disclosed subject matter, a computer-readable medium bearing computer-executable instructions is presented. When the computer-executable instructions are executed on a computing device comprising at least a processor, the execution causes the computing device to carry out a method for creating a calendar event on a calendar, including identifying a first set of calendar event suggestions for creating a calendar event on the calendar, where each calendar event suggestion of the first set of calendar event suggestions corresponds to a first aspect of the calendar event. The first set of calendar event suggestions are presented to the user as a first set of user-actionable controls on the computing device and, in response, a user selection of a first calendar event suggestion of the first set of calendar event suggestions is received. A first attribute associated with the first calendar event suggestion determined and the first attribute is stored in an attribute set corresponding to the calendar event. A subsequent set of calendar event suggestions is identified, where each calendar event suggestion of the subsequent set of calendar event suggestions corresponds to a subsequent aspect of the calendar event other than the first aspect of the calendar event. The subsequent set of calendar event suggestions are presented to the user as a subsequent set of user-actionable controls on the computing device and, in response, a user selection of a subsequent calendar event suggestion of the subsequent set of calendar event suggestions is received. Correspondingly, a subsequent attribute associated with the subsequent calendar event suggestion is determined and stored in the attribute set. A calendar event is created on the calendar according to the attributes in the attribute set in response to an instruction to create the calendar event from the user.

According to still further aspects of the disclosed subject matter, a computing device for creating a calendar event on a calendar is presented. The computing device comprises a processor and a memory, wherein the processor executes instructions stored in the memory as part of or in conjunction with additional components to create a calendar event. The additional components comprise a calendar module which, in response to a request from a computer user to create the calendar event, identifies a first set of calendar event suggestions for creating a calendar event on the calendar and presents the first set of calendar event suggestions to the computer user as a first set of user-actionable controls on the computing device. A user selection of a first calendar event suggestion of the first set of calendar event suggestions is received and a first attribute associated with the selected first calendar event suggestion is determined and stored in an attribute set corresponding to the calendar event. Thereafter, and repeatedly: a subsequent set of calendar event suggestions is identified and presented to the user as user-actionable controls on the computing device; a user selection of a subsequent calendar event suggestion is received and a corresponding subsequent attribute associated with the selected subsequent calendar event suggestion is determined; and the subsequent attribute is stored in the attribute set corresponding to the calendar event. A calendar event is then created on the calendar according to the attributes in the attribute set in response to an instruction to create the calendar event.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
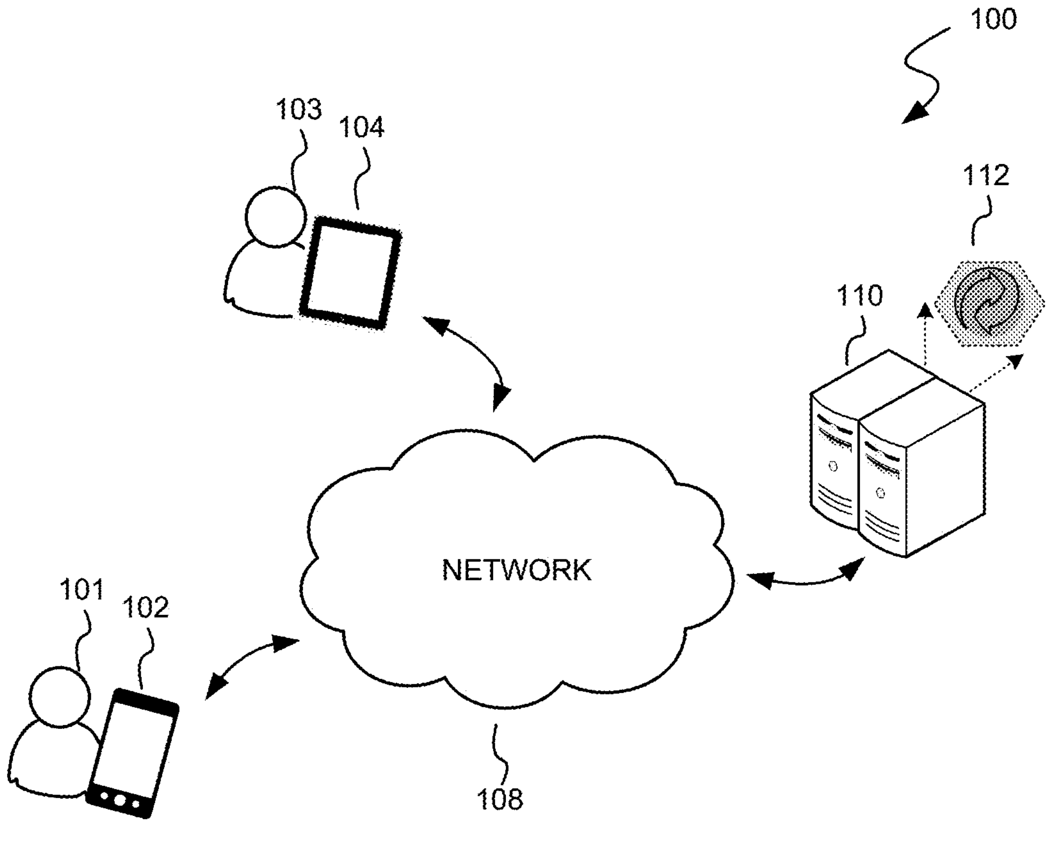
FIG. 1 is a block diagram illustrating an exemplary network environment suitable for implementing aspects of the disclosed subject matter.

By way of definition, a calendar event should be interpreted as an item or occasion that may be placed on a computer user's calendar. The calendar event includes at least a date, time and duration. Additionally, according to aspects of the disclosed subject matter, a calendar event will be created to include a type of event, the type corresponding to a title for the event. While a given event that includes multiple users is typically referred to as a scheduling event, for purposes of this document, calendar events should be viewed as including/encompassing scheduling events. In other words, a calendar event may or may not include or involve computer users other than the creator (or another party for whom the calendar event is being created as is the case for an administrative assistant creating a calendar event for a supervisor.)

By way of further definition, a smart mobile device should be interpreted as being a computing device including a processor and a memory, and connected to other devices or networks via one or more wireless protocols, such as by way of illustration and not limitation: Bluetooth, NFC (near field communications), various Wi-Fi protocols, 3G, and the like. Smart mobile devices can typically operate to some extent interactively and autonomously (i.e., free of assistance of other computing devices.) Examples of smart devices include, by way of illustration and not limitation: smartphones, phablet computing devices ("phablets"), tablet computing devices (tablets), smart watches, smart bands and smart key chains, personal digital assistants, and the like. Typically, though not exclusively, a smart mobile device is interactive by way of a touch-sensitive display screen and/or other buttons or controls on the device, as well as one or more other natural user interfaces (NIUs). Additionally, while the disclosed subject matter is described in the context of operating on a smart mobile device, it should be appreciated that the disclosed subject matter may be alternatively and beneficially implemented on a more full-featured computing device having additional user input mechanisms such as keyboards, pointing devices, and the like. The more full-featured computing devices include, by way of illustration and not limitation a desktop computer, a laptop computer, mini- and/or mainframe computers, and the like.

As indicated above, the disclosed subject matter is directed to efficient calendar event creation. As will be readily appreciated, a typical calendar event creation process involves a computer user identifying a date, time and duration, and then adding additional information such as title, description, additional users, location, and the like. As will be appreciated, this is typically a complex, free-form process which typically requires substantial input by the user through keyboard entry and/or pointing device manipulation (i.e., a mouse, trackball, or some other pointing device.) In contrast to a typical, current process of creating a calendar event and according to the disclosed subject matter, a computer user is presented with a sequence of options to efficiently create a calendar event. Through selection of the various options (by way of user-actionable controls corresponding to the various options) a computer user is able to quickly and efficiently create one or more calendar events, substantially reducing (even eliminating) the amount of free-form textual entry that is required by alternative calendar creation interfaces.

Turning to the figures, FIG. 1 is a block diagram illustrating an exemplary network environment 100 suitable for implementing aspects of the disclosed subject matter. Indeed, FIG. 1 includes user computing devices 102 and 104 (corresponding to computer users 101 and 103 respectively). As indicated above, suitable user computing devices may include, by way of illustration and not limitation: smart phones such as smart phone 102; phablet computing devices (or, more simply, "phablets"); tablet computing devices (tablets) such as tablet device 104; smart watches; smart bands; and smart key chains personal digital assistants; and the like. Similarly (though not shown), computing devices such as desktop computers, laptop computers, and the like may similarly be used to create calendar events.

These computing devices, such as computing devices 102 and 104, as well as others, may be connected to a communication network, such as network 108. By way of illustration and not limitation, the network 108 corresponds to communication technology by which the various computers, including user computing devices 102 and 104, can intercommunicate including sending and receiving data. This communication technology may comprise the Internet (a global system of interconnected computer networks that use the Internet protocol suite to the devices), a wide area network or WAN, a local-area network or LAN, intranets, and various combinations of the foregoing and the like. The various computing devices 102 and 104 may inter-communicate over the network 108 by way of wired connections, wireless connections, optical connections, and the like. Typically, a computing device will communicate over the network with other devices (including computing devices) by way of a network interface comprising hardware and software components that implement the corresponding networking communication protocols for communication over the network.

Also shown in the exemplary network environment is a host computer 110 upon which a calendar process 112 is operating. Indeed, when operating in a network environment (which may be advantageous but is not necessary for enjoyment of the disclosed subject matter), and especially when creating a scheduling type of calendar event involving multiple parties, a user via a computing device such as computing device 102 may request information regarding the schedule of other computer users by way of calendar process 112. The calendar process 112 may host the calendars of the various computer users, such as computer users 101 and 103, or may simply act as an interface in which a first computer users such as computer user 101 may request calendar information from a second computer user such as computer user 103 to determine a suitable time to create a calendar event. By way of illustration, an example of a calendar process 112 includes the calendaring feature of Microsoft's Exchange Server.

While aspects of the disclosed subject matter may be advantageously practiced in a network environment, it should also be appreciated that it is not necessary that a suitably configured computing device be connected to a network, such as network 108. Indeed, a calendar event may be efficiently and advantageously created on a computing device irrespective of network connectivity. Accordingly, the illustrated network environment 100 of FIG. 1 should be viewed as illustrative and not exclusive.

Figure 2A:
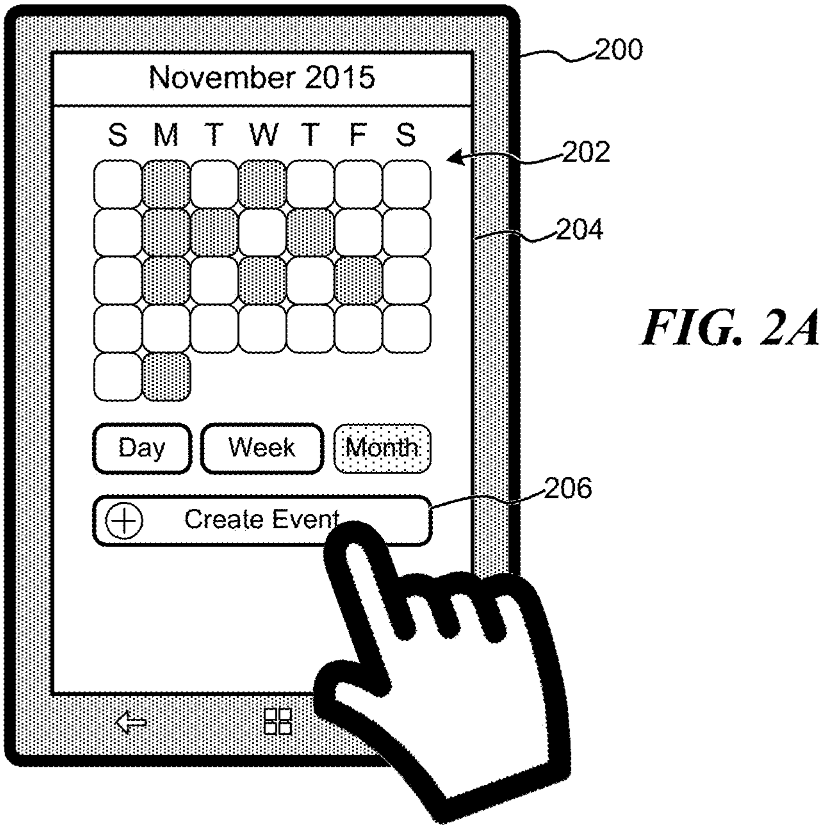
FIGS. 2A-2H are pictorial diagrams illustrating exemplary calendar creation sequences in creating a calendar event according to aspects of the disclosed subject matter.

To illustrate aspect of the disclosed subject matter, particularly in regard to presenting a sequence of options for efficient calendar event creation, reference is now made to FIGS. 2A-2H. As indicated above, FIGS. 2A-2H are pictorial diagrams illustrating exemplary calendar creation sequences in creating a calendar event according to aspects of the disclosed subject matter. Beginning with FIG. 2A, this figure illustrates a user computing device 200 presenting a calendar app 202 configured according to aspects of the disclosed subject matter, and displayed in the display window 204 of the computing device. The calendar app 202 includes a "create event" control 206 by which the computer user may initiate the creation of calendar event through its activation/selection, as indicated in FIG. 2A.

Figure 2B:
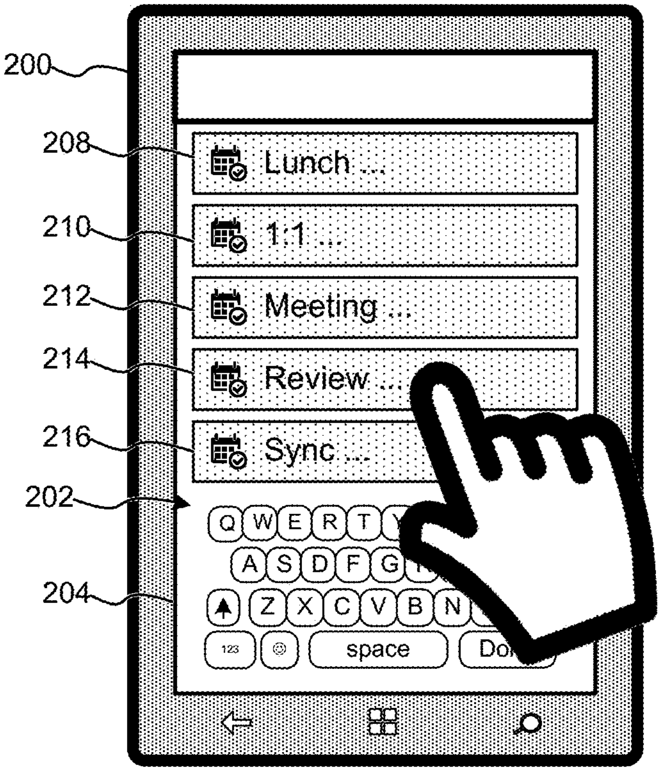

A first result of initiating the creation of a calendar event is displayed in FIG. 2B. According to aspects of the disclosed subject matter, a first set of calendar event suggestions is presented by the calendar app 202 in the display window 204 to the user from which the user may select. This first set of calendar event suggestions, as represented by user-actionable controls 208-216, each corresponding to a particular option, represent a title/type of calendar event. For example, according to the textual information on the control, the user-actionable control 208 corresponds to a "Lunch" calendar event whereas the user-actionable control 210 corresponds to a "1:1" meeting. As should be appreciated, while the title of the calendar event may imply additional information to be presented, in this first instance the "type" of event is simply a calendar event with a title. For purposes of description, it is assumed that the user selects control 214 corresponding to a "Review" event.

Figure 2C:
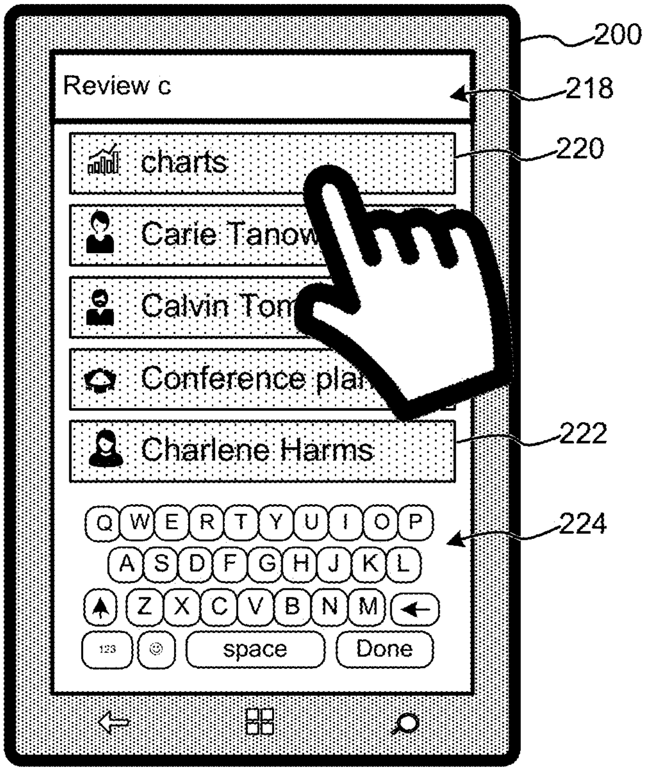

As shown in FIG. 2C, upon selection of an option, the corresponding text of the option is included in a text entry field 218. As shown in FIG. 2B as well as 2C, additionally displayed in the display window 204 is an optional keyboard control 224 comprising multiple controls corresponding to keys by which the user may enter text corresponding to the calendar event. In this instance, it is assumed that the user selected the control "C" which causes the letter "c" to be entered in to the text entry field 218 next to the "Review" text. According to aspects of the disclosed subject matter, in addition to presenting user-actionable controls corresponding to calendar event suggestions, the user-interaction interface also accepts free-form text entry in creating the calendar event. In the instance that the user begins free-form text entry and according to additional aspects of the disclosed subject matter, auto-completion suggestions are presented to the user in the place of calendar event suggestions. As shown in FIG. 2C, after the user has entered the letter "c" into the text entry field 218, a set of auto-completion suggestions are presented. According to aspects of the disclosed subject matter, these auto-completion suggestions are based, at least in part, on previous entries that the user has made, as well as probabilistic completed words. For example, auto-completions suggestions 220 and 222 suggest various potential completed words that the user may select. Of course, as those familiar with auto-completion will appreciate, the user may continue to enter additional characters which may cause the auto-completion suggestions to change or narrow according to the particular text that the user enters. For purposes of this example, it is assumed that the user selects the auto-completion suggestion "charts" (corresponding to user-actionable control 220).

Figure 2D:
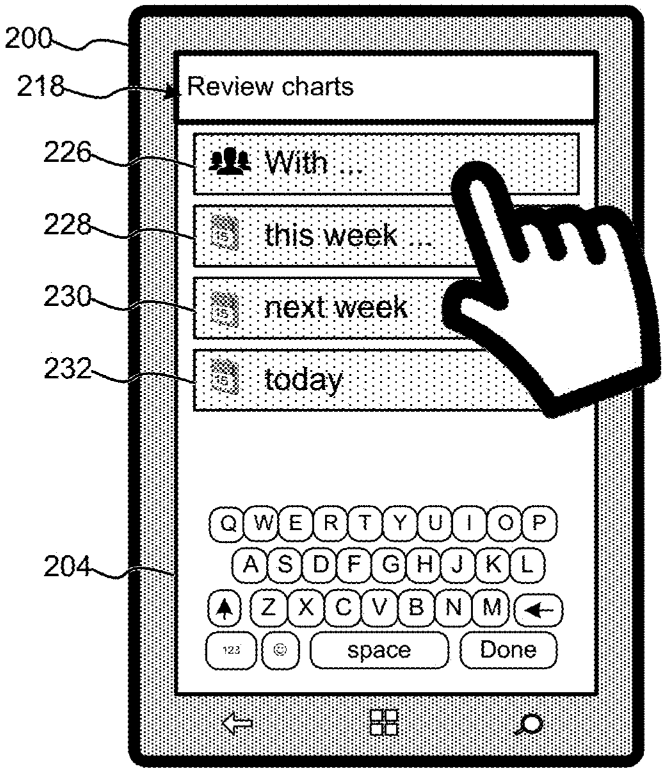

Turning to FIG. 2D, the text entry field 218 now includes "Review charts," reflecting the selection of the review type of calendar event (FIG. 2B) and the selection of an auto-completion word ("charts"). Based on the information that the user has provided (both through selection of calendar options, typing, and auto-suggestions), an additional set of calendar options is presented to the user. As shown in FIG. 2D, this additional set includes preposition type options with regard to the calendar event. These options, as represented by user-actionable controls 226-232 provide additional definition to the calendar event. For example, the "with" user-actionable control 226 provides an indication in creating the calendar event that there will be a selection of additional people. Alternatively, the "this week" user-actionable control 228 provides an indication that the calendar event is to occur during the current week, the "next week" user-actionable control 230 provides an indication that the calendar event is to occur during the upcoming week, and the "today" user-actionable control 232 provides an indication that the calendar event is to occur during the current day. For purposes of the ongoing example, it is assumed that the user selects the "with" user-actionable control 226.

Figure 2E:
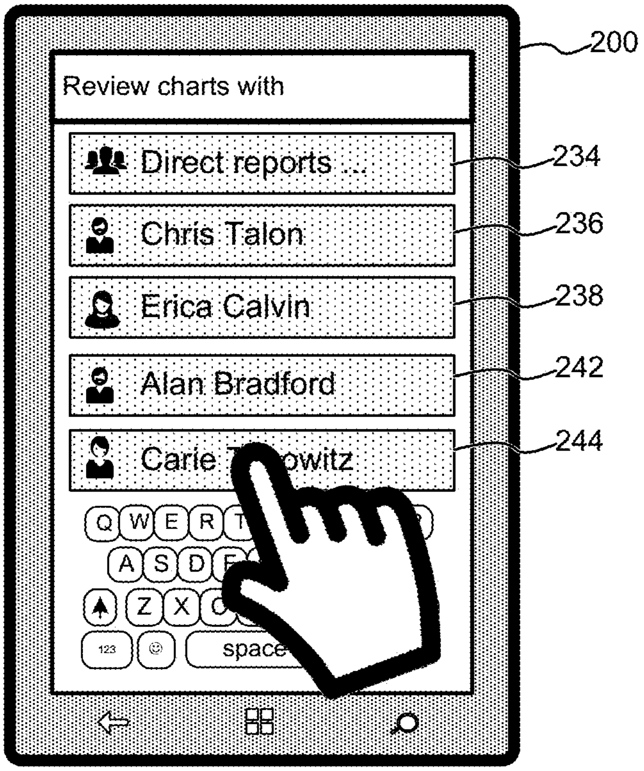

Turning to FIG. 2E, the "with" text from user-actionable control 226 is entered into the text entry field 218 and a subsequent set of calendar options are presented. In this instance, because the preposition "with" indicates that others are to attend, in this iteration the suggestion options include suggested users as represented by user-actionable controls 234-242. According to aspects of the disclosed subject matter, the selection of users to present as suggested options is based on previous user interaction and selection. For example, a calendar creation process (not shown) that generates the various suggestions may determine that the user often invites this set of people (as represented by user-actionable controls 234-242) when conducting a "review." Alternatively, this set of users may be selected simply based on user interaction (including emails) with the set of users. Of course, the user may also type letters of names and receive suggested names based on auto-completion, or by the user simply completing the name of one or more users. For purposes of the on-going example, it is assumed that the user selects Carie (via user-actionable control 242, Chris (via user-actionable control 236), and Erica (via user-actionable control 238).

Figure 2F:
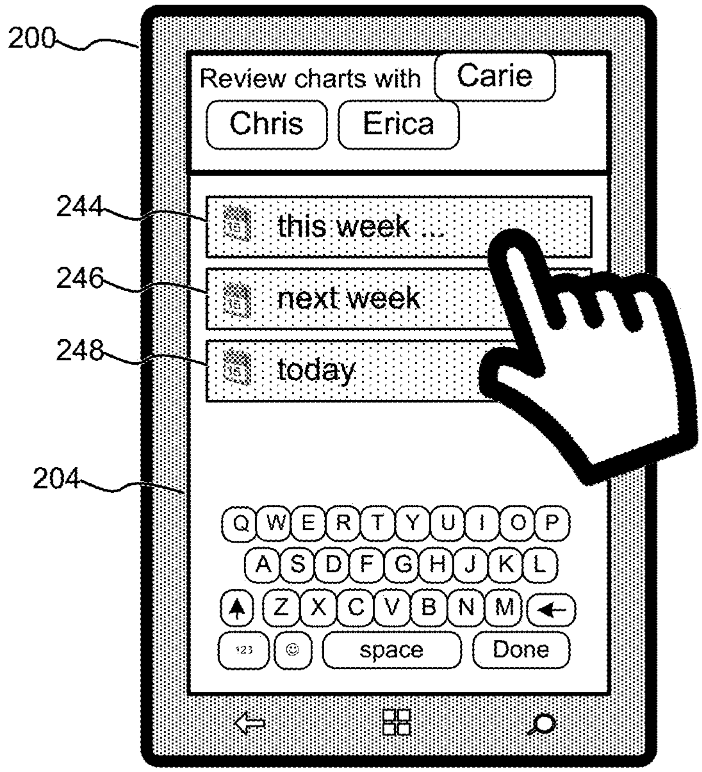

Turning to FIG. 2F, the text entry field 218 is updated with the selected users and the calendar app presents another subsequent set of calendar options, as indicated by user-actionable controls 244-248. With this new set of calendar event suggestions, the user is given an opportunity to identify a time-frame in which the calendar event is to be created. These suggestions, by way of illustration and not limitation, correspond to "this week" (via user-actionable control 244), next week (via user-actionable control 246), and "today" (via user-actionable control 246). For this ongoing example, it is assumed that the user selects "this week."

Figure 2G:
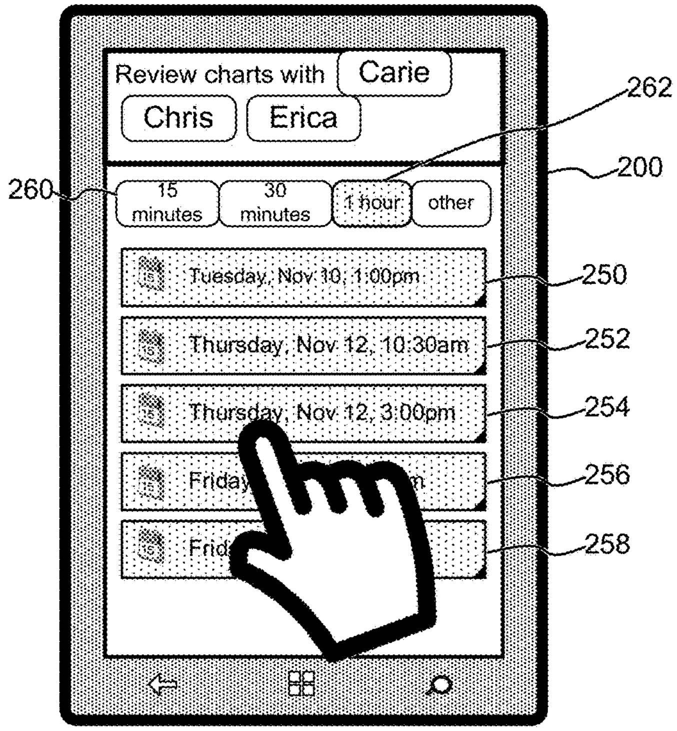
Figure 2H:
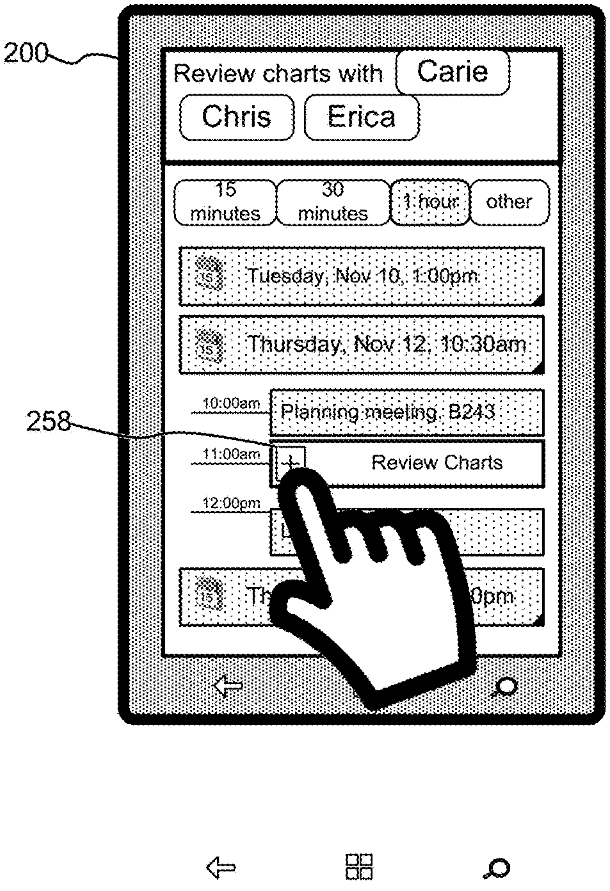

Turning to FIG. 2G, after having selected a time frame, available times that fit the selected time frame are identified and presented as calendar event suggestions, as indicated by user-actionable controls 250-258. In one embodiment, the available times that fit the selected time frame are identified according to an assumed, but reconfigurable, duration of time for the calendar event. These durations of time are configurable via user-actionable controls, such as user-actionable controls 260 and 262, with 1 hour selected as the duration for this calendar event (as indicated by user-actionable control 262). According to aspects of the disclosed subject matter, the calendar event suggestions corresponding to user-actionable controls 250-258, rather than being added to the text entry field, are expandable to present a small view of the corresponding time. Assuming that the user selects the option corresponding to user-actionable controls 254, as shown in FIG. 2H the yet-to-be created calendar event is displayed in the user's calendar with yet another user-actionable control 264 by which the user can add the calendar event (as defined through the various selections) to the user's calendar as well as send any schedule requests to other users as indicated by the various user selections.

As will be appreciated, while other calendar event suggestions of other screens are displayed as involving a simple selection of an option, the disclosed subject matter is not so limited. Indeed, with regard to the user-actionable controls of FIGS. 2F-2H, the user is able to explore the various options (date, time, duration) via the various controls prior to making a selection, via control 258. Moreover, while many of the calendar event suggestions correspond to a single aspect of a calendar event (e.g., who, where, what, etc.), the disclosed subject matter is not so limited. Indeed, as is suggested through FIGS. 2F-2H, a final selection may correspond to multiple aspects, e.g., date, time, duration, such that there are multiple attributes to be derived from a current selection.

Figure 3:
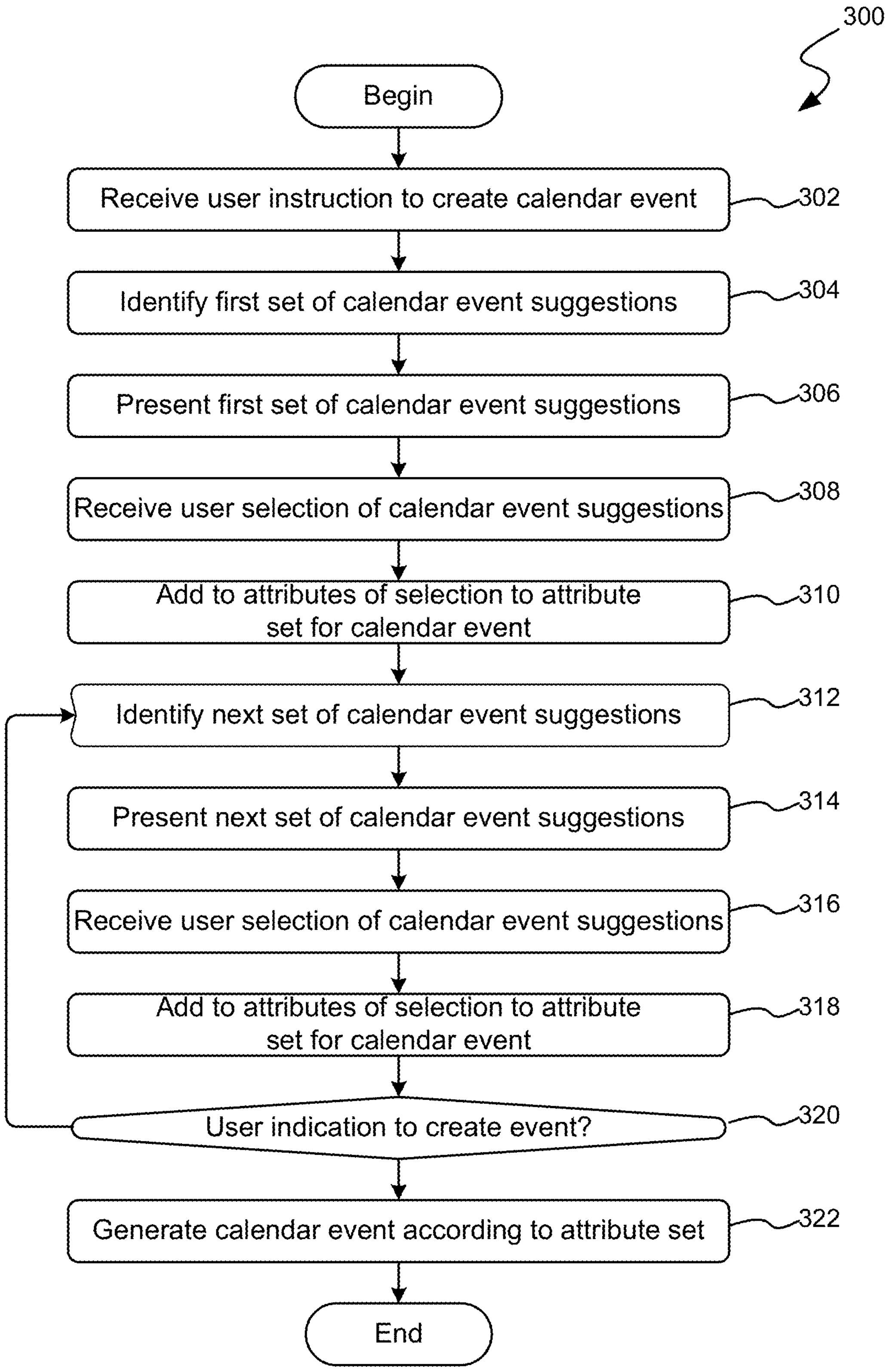
FIG. 3 is a flow diagram illustrating an exemplary routine for efficient creation of a calendar event according to aspects of the disclosed subject matter.

Turning now to FIG. 3, FIG. 3 is a flow diagram illustrating an exemplary routine 300 for efficient creation of a calendar event according to aspects of the disclosed subject matter. As will be appreciated by those skilled in the art, typically though not exclusively, the routine 300 will be implemented as an executable process on a computing device, such as computing device 102 or 104 of FIG. 1. Typically, though not exclusively, the process is embodied on the computing device as an app (a small, typically narrow-focused application for execution by a computing device) or application (a more full-featured computer-implemented application) that is executed on the processor of the computing device.

At block 302, a user instruction to create a calendar event for the user (or for another user) is received. In response to the instruction to create a calendar event, at block 304 a first set of calendar event suggestions is identified and, at block 306, the first set of calendar event suggestions is presented to the user on the computing device.

At block 308, a user selection of the presented calendar event suggestions is received. Correspondingly, at block 310, information regarding the user's selection is added to an attribute set for the to-be-created calendar event. The attribute set for a to-be-created calendar event is described in greater detail below in regard to FIG. 4. While not shown in routine 300, in addition to adding the information regarding the user's selection to the attribute set for the to-be-created calendar event, and as discussed above in regard to FIGS. 2A-2H, information regarding the user's selection may also be added to the text entry field 218 such that the user can visually see the various elements of the to-be-created calendar event.

At block 312, and iteration loop is begun to iterate through additional sets of calendar event suggestions. According to at least one embodiment of the disclosed subject matter, at least two sets of calendar event suggestions are presented in regard to creating a calendar event. These at least two sets of calendar event suggestions include suggestions regarding a calendar type/title (as described above in regard to FIG. 2A) and suggestions regarding a date/time/duration for the to-be-created calendar event. Of course, depending on the particular selection of any given set of calendar event suggestions, additional suggestions may be presented. Indeed, as will be discussed in greater detail below, calendar event suggestions may be driven according to a defined set of templates for generating calendar event suggestions.

In regard to the iteration loop, at block 312, a subsequent/next set of calendar event suggestions based, at least in part, on the initial user selection of calendar event suggestions is identified. At block 314, the next set of calendar event suggestions (identified in block 312) is presented to the user on the computing device. At block 316, a user selection of the calendar event suggestions is received. At block 318, information regarding the user's latest selection as added to the attribute set for the to-be-created calendar event.

At decision block 320, the determination is made as to whether the user has made an indication to create the calendar event according to the various calendar attributes previously identified through user selection of calendar event suggestions (as well as through user entry, i.e., free-form data entry). If not, the routine 300 returns to block 312 to identify a next, subsequent set of calendar event suggestions and repeat the steps 314-318 described above. Alternatively, if the user has made an indication to create the calendar event according to the various calendar attributes previously identified, the routine proceeds to block 322.

At block 322, calendar event is created for the user (typically, though not exclusively, on the user's calendar) according to the attribute set defined through the selection of calendar event suggestions and user input. As indicated above, creating the calendar event may also entail sending scheduling request to various other users identified in the calendar event creation process. Thereafter, the routine 300 terminates.

Regarding routine 300 described above, as well as other processes describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be omitted. Those skilled in the art will recognize that the logical presentation of steps is sufficiently instructive to carry out aspects of the claimed subject matter irrespective of any particular development language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines/processes are typically embodied within executable code modules comprising routines, functions, looping structures, selectors such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or deliver the computer-executable instructions and data to a computing device for execution by one or more processor via various transmission means and mediums including carrier waves and/or propagated signals, for purposes of this disclosure computer readable media expressly excludes carrier waves and/or propagated signals.

Figure 4:
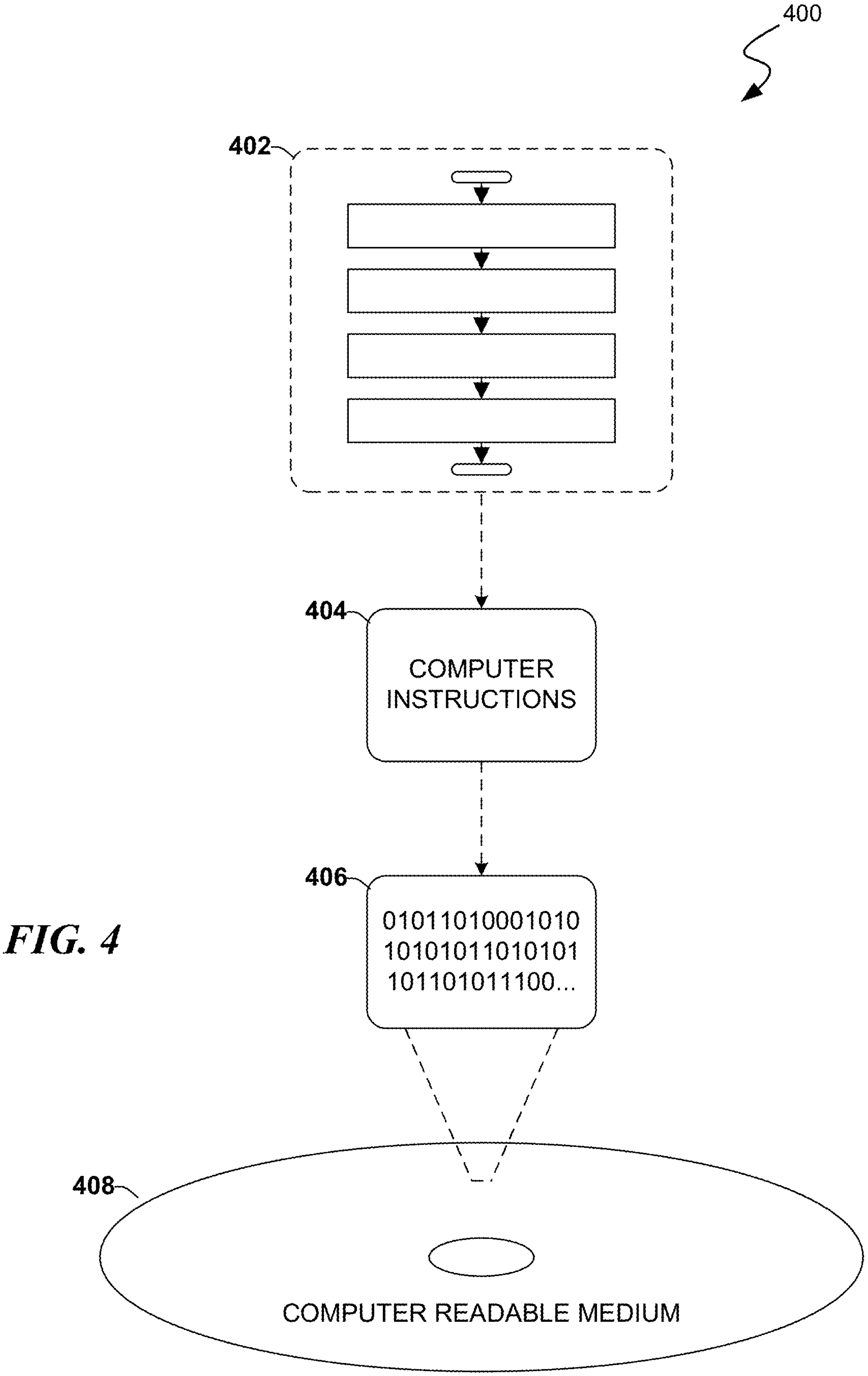
FIG. 4 is a block diagram illustrating an exemplary computer readable medium encoded with instructions to create a calendar event according to aspects of the disclosed subject matter.

Turning to FIG. 4, FIG. 4 is a block diagram illustrating an exemplary computer readable medium encoded with instructions to create a calendar event according to aspects of the disclosed subject matter. More particularly, the implementation 400 comprises a computer-readable medium 408 (e.g., a CD-R, DVD-R or a platter of a hard disk drive), on which is encoded computer-readable data 406. This computer-readable data 406 in turn comprises a set of computer instructions 404 configured to operate according to one or more of the principles set forth herein. In one such embodiment 402, the processor-executable instructions 404 may be configured to perform a method, such as at least some of the exemplary method 300 of FIG. 3, for example. In another such embodiment, the processor-executable instructions 404 may be configured to implement a system, such as at least some of the exemplary system 600 of FIG. 6, as described below. Many such computer-readable media may be devised by those of ordinary skill in the art that are configured to operate in accordance with the techniques presented herein.

Figure 5:
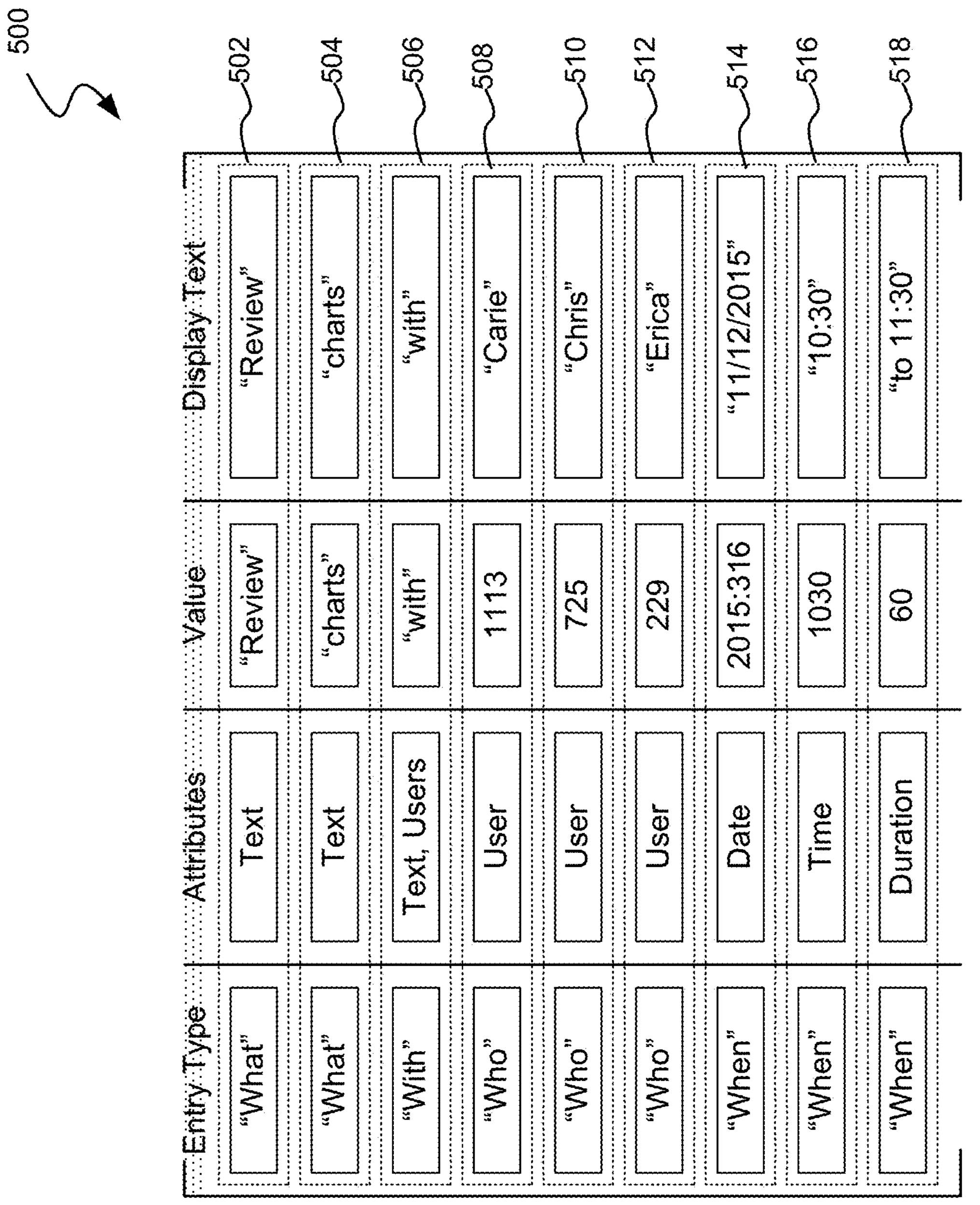
FIG. 5 is block diagram illustrating an calendar event attribute set generated in regard to creating a calendar event.

Regarding the attribute set of a to-be-created calendar event, FIG. 5 is block diagram illustrating an exemplary calendar event attribute set 500 generated in regard to creating a calendar event. Indeed, the attribute set 500 reflects the various user selections and inputs described above in regard to FIGS. 2A-2H. For example, attribute set element 502 indicates a "what" type of calendar event, i.e., a review event. As mentioned above, this indicates the "what" of the calendar event, but as far as particular attributes, this creates text to be placed in the text entry field 218. Similarly, regarding attribute set element 504, the user supplied text "charts" is categorized as "what" and has an attribute of text.

Attribute set element 506 was classified as a "with" type of element and, as such, the attribute for this entry is both text and an indication, i.e., "users", that there will be users added to this calendar event, as indicated by attribute set elements 508-512. Attribute set elements 514-518 are classified as "when" elements and their particular attributes correspond to a date, a time, and a duration respectively. As indicated above, based on the information in this attribute set, the to-be-created calendar event is generated and added to at least one calendar.

As suggested above, the calendar event suggestions may be based according to a user's past actions, particularly in regard to the type of events placed on his/her calendar, the people that are involved, the titles of the events, the dates, times and durations, and the like. In addition to generating suggestions according to prior user calendar events and schedules, calendar event suggestions may be guided according to templates. A suggestion template may indicate suggestions corresponding of a particular aspect of the to-be-created calendar event to be made given the current context. For example, a first set of calendar event suggestions, as guided by a suggestion template, may correspond to a type/title of a calendar event. Moreover, a suggestion template may be organized in a type of decision tree. Indeed, where the suggestion template may indicate that the first suggestions are to be the type/title of the calendar event, a subsequent set of calendar event suggestions may be based on the selection of the first calendar event suggestions guided by information of the decision tree in the suggestion template. For example, if a user selects a first type of calendar event from a first set of suggestions, a subsequent set of suggestions may be directed to an event aspect such who (other users), where (location of the calendar event), when (date, time and duration), purpose (e.g., 1:1 meeting, lunch, etc.), and the like. Of course, there is no particular requirement that a suggestion template presents, as the first set of calendar event suggestions, information regarding the type/title of the calendar event. Indeed, in various embodiments, a suggestion template may initially focus on a date, time, and/or duration.

Figure 6:
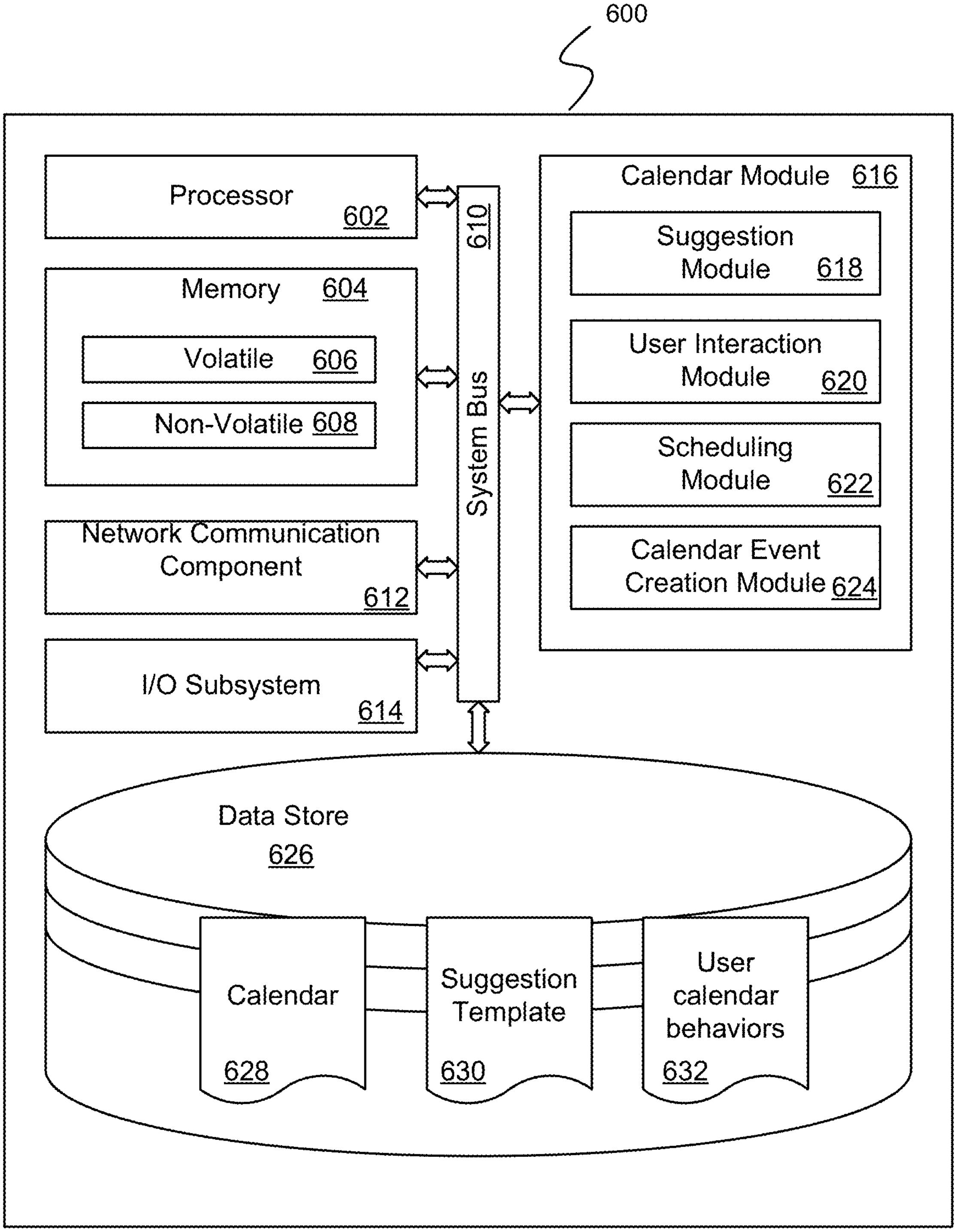
FIG. 6 is a block diagram illustrating an exemplary computing device suitable for implementing aspects of the disclosed subject matter.

Turning now to FIG. 6, FIG. 6 is a block diagram illustrating an exemplary user computing device 600 suitable for implementing aspects of the disclosed subject matter. The exemplary user computing device 600 includes one or more processors (or processing units), such as processor 602, and a memory 604. The processor 602 and memory 604, as well as other components, are interconnected by way of a system bus 610. The memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

The processor 602 executes instructions retrieved from the memory 604 (and/or from computer-readable media, such as computer-readable media 400 of FIG. 4) in carrying out various functions, particularly in regard to responding to creating a calendar event on a calendar, as discussed and described above. The processor 602 may be comprised of any of a number of available processors such as single-processor, multi-processor, single-core units, and multi-core units.

Further still, the illustrated user computing device 600 includes a network communication component 612 for interconnecting this computing device with other devices and/or services over a computer network, including other user devices, such as user computing devices 102 and 104, as well as host computer 110 and calendar process 112 shown in FIG. 1. The network communication component 612, sometimes referred to as a network interface card or NIC, communicates over a network (such as network 108) using one or more communication protocols via a physical/tangible (e.g., wired, optical, etc.) connection, a wireless connection, or both. As will be readily appreciated by those skilled in the art, a network communication component, such as network communication component 612, is typically comprised of hardware and/or firmware components (and may also include or comprise executable software components) that transmit and receive digital and/or analog signals over a transmission medium (i.e., the network.)

The exemplary user computing device 600 also includes an I/O subsystem 614. As will be appreciated, an I/O subsystem comprises a set of hardware, software, and/or firmware components that enable or facilitate inter-communication between a user of the computing device 600 and the processing system of the computing device 600. Indeed, via the I/O subsystem 614 a computer user may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer user and the computing device 600 is enabled via the I/O subsystem 614 of the computing device.

The exemplary user computing device 600 further includes an executable calendar module 616. The calendar module 616 is typically, though not exclusively, embodied as an executable app or application that, in execution on the exemplary computing device 600, carries out the functionality of an electronic, digital calendar and, particularly, a digital calendar that provides the efficient calendar event creation as described above. The calendar module 616 carries out the functionality of efficient calendar event creation by way of one or more modules including a suggestion module 618, a user interaction module 620, a scheduling module 622 and a calendar event creation module 624.

The suggestion module 618 identifies calendar event suggestions in regard to defining the various elements of a to-be-created calendar event. In identifying calendar event suggestions, the suggestion module 618 may rely upon any or all of the user's calendar 628 (or another person's calendar, especially in the case of creating a calendar event for another person), a suggestion template 630, and the user's calendar behaviors and preferences 632, each of which may be stored in a data store 626 disposed on the computing device 600. The user interaction module 620 presents the calendar suggestions to the user as well as receives selections of the suggestions by way of the I/O subsystem 614. The selections (and other input provided by the user) are temporarily stored in memory 604 as an attribute set, such as attribute set 500.

The scheduling module 622 identifies potential "time slots," i.e., dates and times in which the to-be-created calendar event may be scheduled, typically without conflict with other calendar events. In some instances, this identification may be determined on the computing device 600 in conjunction with the user's calendar 628. However, in alternative embodiments (not shown), the user's calendar may be hosted by a calendar process 112 on a host computer 110. In these embodiments, and/or in circumstances where calendar data of other users is also necessary, the scheduling module 622 may communicate (via the network communication component 612) with the calendar process 112 to obtain calendar information and/or potential time slots for the to-be-created calendar event.

The calendar event creation module 624 utilizes the calendar event attribute set, such as calendar event attribute set 500, to generate a calendar event in the user's calendar 628. Of course, as with the scheduling module 622, if the user's calendar 628 is hosted remotely by the calendar process 112 on a host computer 110, and/or if the calendar event involves other people, the calendar event creation module 624 may cooperatively work with the calendar process 112 to create the calendar event according to the corresponding calendar event attribute set.

Regarding the various components of the exemplary computing device 600, those skilled in the art will appreciate that these components may be implemented as executable software modules stored in the memory of the computing device, as hardware modules and/or components (including SoCs—system on a chip), or a combination of the two. Indeed, as indicated above, components such as the calendar module 616 and it sub-components including the suggestion module 618, the user interaction module 620, the scheduling module 622, and the calendar event creation module 624 may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the exemplary computing device 600 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network, such as network 108 of FIG. 1.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for creating a calendar event on a calendar in response to a request from a computer user to create the calendar event, the method comprising each of the following as implemented by a computing device:

in response to receiving a user selection of a create event control included within a first user interface displayed on the computing device:

identifying a first set of calendar event suggestions for the calendar event and presenting the first set of calendar event suggestions to the user as user-actionable controls within a second user interface displayed on the computing device, wherein each calendar event suggestion of the first set of calendar event suggestions corresponds to an option for a first aspect of the calendar event;

receiving a user selection of a first calendar event suggestion of the first set of calendar event suggestions via the user-actionable controls within the second user interface;

in response to receiving the user selection of the first calendar event suggestion:

determining a first attribute associated with the first calendar event suggestion and storing the first attribute in an attribute set corresponding to the calendar event, the first attribute stored as the first aspect of the calendar event;

identifying a subsequent set of calendar event suggestions for the calendar event and presenting the subsequent set of calendar event suggestions to the user as user-actionable controls within a third user interface displayed on the computing device, wherein each calendar event suggestion of the subsequent set of calendar event suggestions corresponds to an option for a subsequent aspect of the calendar event other than the first aspect of the calendar event; and receiving a user selection of a subsequent calendar event suggestion of the subsequent set of calendar event suggestions via the user-actionable controls within the third user interface; and in response to receiving the user selection of the subsequent calendar event suggestion:

determining a subsequent attribute associated with the subsequent calendar event suggestion; and storing the subsequent attribute in the attribute set corresponding to the calendar event, the subsequent attribute stored as the subsequent aspect of the calendar event; and creating the calendar event on the calendar according to the attributes in the attribute set in response to receiving an instruction to create the calendar event from the user.

2. The computer-implemented method of claim 1:

wherein the steps of identifying a subsequent set of calendar event suggestions, receiving a user selection of a subsequent calendar event suggestion, determining a subsequent attribute associated with the subsequent calendar event suggestion, and storing the subsequent attribute in the attribute set are repeated at least once;

wherein the subsequent set of calendar event suggestions in each iteration of identifying a subsequent set of calendar event suggestions identifies a distinct set of calendar event suggestions; and wherein subsequent attribute associated with the subsequent calendar event suggestion in each iteration determining the subsequent attribute associated with the subsequent calendar event suggestion is a distinct subsequent attribute of other subsequent attributes.

3. The computer-implemented method of claim 2, wherein the first set of calendar event suggestions and each subsequent set of calendar event suggestions corresponds to an aspect of the calendar event, and wherein the aspect of the calendar event of the first set of calendar event suggestions and of each subsequent set of calendar event suggestions is determined according to a suggestion template.

4. The computer-implemented method of claim 3, wherein at least one set of calendar event suggestions corresponds to an aspect of the calendar event comprising a type of the calendar event.

5. The computer-implemented method of claim 3, wherein at least one set of calendar event suggestions corresponds to an aspect of the calendar event comprising a location of the calendar event.

6. The computer-implemented method of claim 3, wherein at least one set of calendar event suggestions corresponds to an aspect of the calendar event comprising a person to attend the calendar event.

7. The computer-implemented method of claim 3, wherein at least one set of calendar event suggestions corresponds to a plurality of aspects of the calendar event.

8. The computer-implemented method of claim 3, wherein the first set of calendar event suggestions and each subsequent set of calendar event suggestions are determined according to an aspect of the calendar event and prior user behavior with regard to that aspect of the calendar event.

9. The computer-implemented method of claim 3, wherein creating the calendar event on the calendar according to the attributes in the attribute set comprises creating the calendar event on the calendar according to a date attribute, a time attribute, a duration attribute and a type attribute in the attribute set.

10. A computer-readable medium bearing computer-executable instructions which, when executed on a computing device comprising at least a processor, carry out a method for creating a calendar event on a calendar, the method comprising:

in response to receiving a user selection of a create event control included within a first user interface displayed on the computing device:

identifying a first set of calendar event suggestions for the calendar event, wherein each calendar event suggestion of the first set of calendar event suggestions corresponds to an option for a first aspect of the calendar event;

presenting the first set of calendar event suggestions to the user as a first set of user-actionable controls within a second user interface displayed on the computing device;

receiving a user selection of a first calendar event suggestion of the first set of calendar event suggestions via the first set of user-actionable controls within the second user interface;

in response to receiving the user selection of the first calendar event suggestion:

determining a first attribute associated with the first calendar event suggestion and storing the first attribute in an attribute set corresponding to the calendar event, the first attribute stored as the first aspect of the calendar event;

identifying a subsequent set of calendar event suggestions for creating the calendar event, wherein each calendar event suggestion of the subsequent set of calendar event suggestions corresponds to an option for a subsequent aspect of the calendar event other than the first aspect of the calendar event;

presenting the subsequent set of calendar event suggestions to the user as a subsequent set of user-actionable controls within a third user interface displayed on the computing device;

receiving a user selection of a subsequent calendar event suggestion of the subsequent set of calendar event suggestions via the user-actionable controls within the third user interface;

determining a subsequent attribute associated with the subsequent calendar event suggestion; and storing the subsequent attribute in the attribute set corresponding to the calendar event, the subsequent attribute stored as the subsequent aspect of the calendar event; and creating the calendar event on the calendar according to the attributes in the attribute set in response to receiving an instruction to create the calendar event from the user.

11. The computer-readable medium of claim 10, wherein the steps of identifying a subsequent set of calendar event suggestions, receiving a user selection of a subsequent calendar event suggestion, determining a subsequent attribute associated with the subsequent calendar event suggestion, and storing the subsequent attribute in the attribute set are repeated at least once.

12. The computer-readable medium of claim 11:

wherein the subsequent set of calendar event suggestions in each iteration of identifying a subsequent set of calendar event suggestions identifies a distinct set of calendar event suggestions; and wherein subsequent attribute associated with the subsequent calendar event suggestion in each iteration determining the subsequent attribute associated with the subsequent calendar event suggestion is a distinct subsequent attribute of other subsequent attributes.

13. The computer-readable medium of claim 12, wherein the first set of calendar event suggestions and each subsequent set of calendar event suggestions corresponds to an aspect of the calendar event.

14. The computer-readable medium of claim 13, wherein the aspect of the calendar event of the first set of calendar event suggestions and of each subsequent set of calendar event suggestions is determined according to a suggestion template.

15. The computer-readable medium of claim 14, wherein the first set of calendar event suggestions and each subsequent set of calendar event suggestions are determined according to an aspect of the calendar event and a prior user behavior with regard to the corresponding aspect of the calendar event.

16. The computer-readable medium of claim 14, wherein at least one set of calendar event suggestions corresponds to an aspect of the calendar event comprising a type of the calendar event, and a location for the calendar event.

17. The computer-readable medium of claim 14, wherein at least one set of calendar event suggestions corresponds to an aspect of the calendar event comprising one or more persons other than the computer user to attend the calendar event.

18. The computer-readable medium of claim 12, wherein the method further comprises:

receiving user input independent of the user-actionable controls within the second user interface and the user-actionable controls within the third user interface;

adding the user input as a user-added attribute in the attribute set corresponding to the calendar event.

19. The computer-readable medium of claim 18, wherein the user input independent of the user-actionable controls within the second user interface and the user-actionable controls within the third user interface comprises textual input via a text input control.

20. A computing device for creating a calendar event on a calendar, the computing device comprising:

a processor and a memory, wherein the processor is configured to:

in response to receiving a user selection of a create event control included within a first user interface displayed on the computing device:

identify a first set of calendar event suggestions for the calendar event and present the first set of calendar event suggestions to the user as a first set of user-actionable controls on the computing device, wherein each calendar event suggestion of the first set of calendar event suggestions corresponds to an option for a first aspect of the calendar event;

receive a user selection of a first calendar event suggestion of the first set of calendar event suggestions via the first set of user-actionable controls;

in response to receiving the user selection of the first calendar event suggestion:

determine a first attribute associated with the first calendar event suggestion and storing the first attribute in an attribute set corresponding to the calendar event, the first attribute stored as the first aspect of the calendar event;

identify a subsequent set of calendar event suggestions for creating the calendar event and present the subsequent set of calendar event suggestions to the user as a second set of user-actionable controls on the computing device, wherein each calendar event suggestion of the subsequent set of calendar event suggestions corresponds to an option for a subsequent aspect of the calendar event other than the first aspect of the calendar event;

receive a user selection of a subsequent calendar event suggestion of the subsequent set of calendar event suggestions via the second set of user-actionable controls;

determine a subsequent attribute associated with the subsequent calendar event suggestion; and store the subsequent attribute in the attribute set corresponding to the calendar event, the subsequent attribute stored as the subsequent aspect of the calendar event; and create the calendar event on the calendar according to the attributes in the attribute set in response to receiving an instruction to create the calendar event from the user.

* * * * *